United States Patent [19]

Okachi et al.

[11] Patent Number: 5,197,363
[45] Date of Patent: Mar. 30, 1993

[54] SPINDLE DRIVING DEVICE FOR A MACHINE TOOL

[75] Inventors: Hiroaki Okachi; Takahiro Hayashida; Mahito Unno, all of Aichi, Japan

[73] Assignee: Mitsubishi Denki K.K., Tokyo, Japan

[21] Appl. No.: 537,737

[22] Filed: Jun. 14, 1990

[30] Foreign Application Priority Data

Jun. 15, 1989 [JP] Japan ................... 1-152971

[51] Int. Cl.[5] .................. B23B 3/06; B23Q 5/10
[52] U.S. Cl. ........................ 82/118; 82/129; 318/625; 364/474.11
[58] Field of Search ............ 82/1.11, 142, 129, 118; 364/474.11; 318/625, 98, 101, 102, 103

[56] References Cited

U.S. PATENT DOCUMENTS

| | | | |
|---|---|---|---|
| 4,457,193 | 7/1984 | Mathey | 82/129 |
| 4,683,786 | 8/1987 | Kersten et al. | 82/129 |
| 4,837,491 | 6/1989 | Fujioka et al. | 318/625 |
| 4,862,380 | 8/1989 | Kawamura | 364/474.11 |
| 5,027,680 | 7/1991 | Kohari et al. | 82/1.11 |

FOREIGN PATENT DOCUMENTS

| | | |
|---|---|---|
| 0098309 | 1/1984 | European Pat. Off. |
| 0242870 | 10/1987 | European Pat. Off. |
| 0290693 | 11/1988 | European Pat. Off. |
| 298672 | 1/1989 | European Pat. Off. ........ 82/129 |
| 0303300 | 2/1989 | European Pat. Off. |
| 2413160 | 8/1979 | France ........ 82/129 |
| 2520105 | 7/1983 | France ........ 82/118 |
| 8910223 | 11/1989 | PCT Int'l Appl. ........ 82/129 |
| 2061554 | 5/1981 | United Kingdom |
| 2092333 | 8/1982 | United Kingdom |

*Primary Examiner*—Z. R. Bilinsky
*Attorney, Agent, or Firm*—Sughrue, Mion, Zinn, Macpeak & Seas

[57] ABSTRACT

The invention relates to a spindle drive controller for a machine tool such as a numerically controlled lathe of the two spindle type. According to the invention, a drive control unit is enabled to separately control the spindles, or jointly control both spindles simultaneously. A switchover unit controls whether one or both spindles is controlled, and changeover units are provided for selectively feeding back speed and position feedback signals from one or the other of the respective spindles, depending on which spindle is being driven at that time.

8 Claims, 3 Drawing Sheets

SPINDLE DRIVING DEVICE FOR A MACHINE TOOL

BACKGROUND OF THE INVENTION

The present invention relates to a speed control unit for a numerically controlled machine tool of the type including two main spindles and independent spindle driving motors.

In FIG. 2, there is illustrated a conventional construction for driving the main spindles of a two-spindle numerically controlled lathe. FIG. 2(a) illustrates components for driving the first main spindle. FIG. 2(b) depicts the components which drive the second main spindle, sometimes referred to as the "auxiliary" spindle. The construction in both cases is fundamentally the same. The components on the side of the second main spindle are all marked with the subscript "a".

In FIG. 2, numerals 1 and 1a represent the main spindles; 2 and 2a are spindle driving motors; 3 and 3a are speed detecting units; 4, 4a, 5 and 5a are pulleys; 6 and 6a represent belts; 7 and 7a are chucks for holding workpieces 8, the chucks being provided at the head of each spindle; 9 is a cutting tool or the like; and 10 and 10a are spindle drive control units. The spindle drive control unit 10 comprises an adder 101 for computing a deviation between a first speed command $N_{s1}$ and speed detection signals $N_1$ transmitted from the speed detecting means 3, and a speed control circuit 102 for controlling the power supplied to the main spindle driving motor 2 by amplifying the deviation signal. The control unit 10a is likewise composed of an adder 101a and a speed control circuit 102a. In the great majority of cases, the main spindle driving motor is typically an induction motor. In this case, a known vector control method based on a slip frequency mode is adopted for control of the speed control circuits 102 and 102a, with a view to improving the respondency of the output torque.

Referring again to FIG. 2, central portions of the main spindles 1 and 1a are hollowed out to permit consecutive machining of the elongate workpieces 8 which are inserted and pass through hollows in the spindles.

In the numerically controlled machine tool, the speed commands $N_{s1}$ and $N_{s2}$ are issued from numerical control units which are not illustrated in the Figures.

The operation of this system in the case where the products depicted in FIG. 3(b) are consecutively produced from the elongate workpiece of FIG. 3(a) will now be described. First, as illustrated in FIG. 2, the workpiece 8 is located at the first main spindle and held by the chuck 7. The driving motor 2 is rotationally controlled, with the result that power is transferred via the pulleys 4 and 5 and the belt 6 to the main spindle 1. The main spindle is thus rotated, and the workpiece 8 is thereby rotated. While moving the tool 9 in directions X and Z, the workpiece 8 undergoes lathe turning. FIG. 4(a) illustrates the state in which the workpiece has been machined, the machined portion being indicated by vertical hatching.

Subsequently, the main spindle 1 is stopped. If necessary, a mechanism for halting the spindle at a given position is provided. An oriented stop of the main spindle may involve the use of mechanical or electrical means or both. These means are, however, not illustrated in FIG. 2, because they are not directly associated with the present invention. The second main spindle also remains rotationally stationary and fixed, in which state the second main spindle mechanism is moved in direction (−Z). The workpiece 8 is grasped by the chuck 7a when in position. Thereafter, the chuck 7 of the first main spindle is loosened, and the second main spindle 1a is made to retract in the direction Z. The workpiece 8 is pulled from the first main spindle 1, and then again clamped by the chuck 7 of the first main spindle 1. This state is illustrated in FIG. 4(b). The workpiece 8 is held by the chucks 7 and 7a, in which state the first and second main spindles are rotationally controlled at the same velocity. As depicted in FIG. 4(c), further machining is performed, eventually resulting in a complete product on the side of the second main spindle 1a. The second spindle 1a is then stopped, and the completely machined product is removed. Subsequently, the machining procedures described above are repeated, whereby products can successively be manufactured from the elongated workpiece.

On the occasion of performing lathe turning while simultaneously retaining the workpiece using chucks 7 and 7a of the first and second main spindles, position detecting means 11 and 11a provided at the ends of the first and second main spindles are used, which work with position comparing means 103 and 103a to, in turn, constitute a positional control loop. With this configuration, speed commands $N_{s1}$ and $N_{s2}$ are substituted by the outputs of units 103, 103a, and positional synchronization of the first and second main spindles is executed. The positional synchronization is effective in enhancing machining accuracy. Note that $\theta_{s1}$ and $\theta_{s2}$ represent the positional commands.

SUMMARY OF THE INVENTION

The prior art numerically controlled lathe equipped with two main spindles and two main spindle driving motors and controls had the above-mentioned construction. Because two completely independent control units were provided (e.g., 10 and 10a), the cost of producing the system was very high.

Accordingly, it is a primary object of the present invention, which was made to eliminate the foregoing problem, to provide an inexpensive main spindle driving control unit, capable of controlling two main spindles, and suitable for consecutive machining and manufacturing processes.

The main spindle drive control unit according to the present invention comprises a single control unit for driving both main spindle driving motors and receiving inputs from speed detecting means linked to these spindle driving motors, and a change-over device for selectively causing a speed detection signal change-over means to select one of the signals transmitted from the two speed detecting means to be sent to the drive control unit to control one or both of the driving motors.

There is also provided a position detection signal change-over device for selecting the output of one of the two position detecting means respectively linked to the main spindles.

The control unit, the change-over device and the speed detection signal change-over means according to the present invention perform selective change-over control between a drive mode for the first main spindle driving motor, a drive mode for the second main spindle driving motor and a simultaneous derive mode for both the first and second main spindle driving motors. Positional control may be controlled by the position detection signal change-over means.

BRIEF DESCRIPTION OF THE DRAWINGS

Throughout the drawings, the same symbols indicate like or corresponding components.

DETAILED DESCRIPTION OF THE PREFERRED EMBODIMENTS

Figure 1:
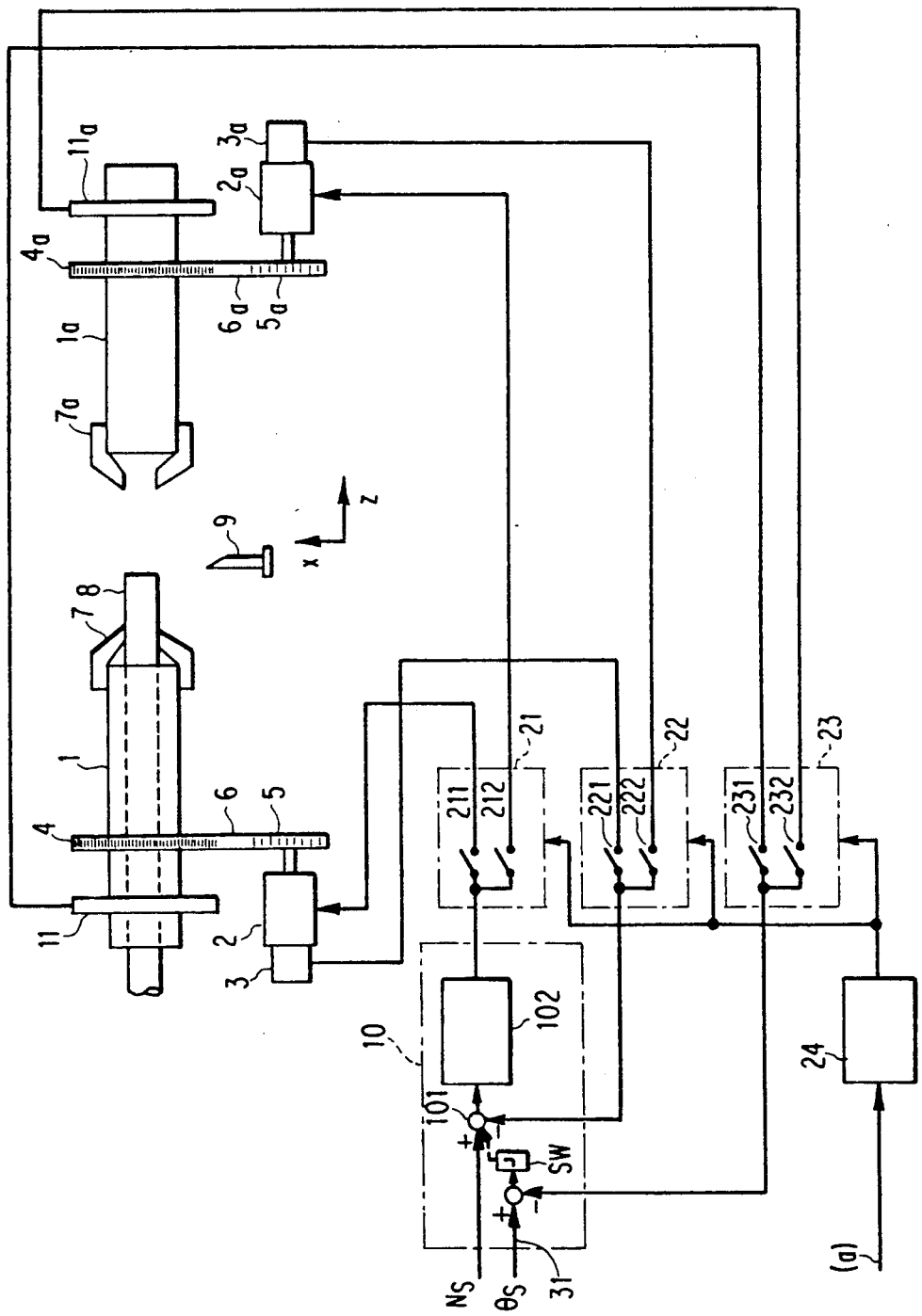
FIG. 1 is a block diagram of a main spindle driving control unit, showing one embodiment of the present invention.
Figures 2A, 2B:
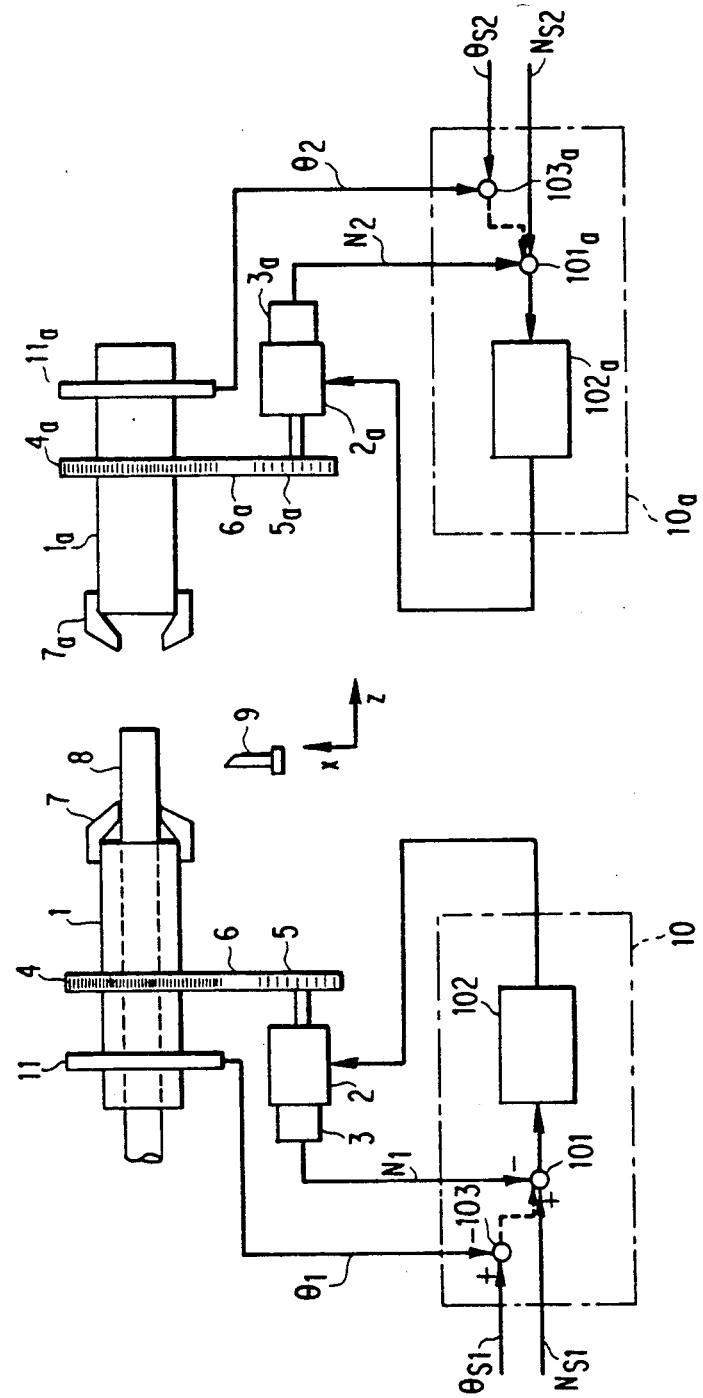
FIG. 2(a) and FIG. 2(b) show a block diagram illustrating a conventional main spindle driving control unit.

FIG. 1 shows one embodiment of the present invention.

The components marked with numerals 1–11, 1a–7a and 11a are the same as in the prior art example. Designated at 21 is a drive change-over means composed of switches 211 and 212 such as contactors or the like. Indicated at 22 is a speed detection signal change-over means consisting of change-over switches 221 and 222. Numeral 23 denotes a position detection signal change-over means composed of change-over switches 231 and 232. Numeral 24 represents a signal switch over control circuit, to which a change-over command is inputted from the numerical control unit, for controlling the switching of the change-over means 21, 22 and 23. The switches 211 and 212 of the drive change-over means 21 are selectable between following three operation modes in response to output signals transmitted from the switch over control circuit 24:

| Operation mode of drive change-over means 21 | Condition |
|---|---|
| 1 | 211 is ON, while 212 is OFF |
| 2 | 211 is OFF, while 212 is ON |
| 3 | 211 and 212 are ON |

The change-over switches 221 and 222 of the speed detection signal change-over means 22 are selectable between the following two operation modes in response to the output signals transmitted from the control circuit 24:

| Operation mode of speed detection signal change-over means 22 | Condition |
|---|---|
| A | 221 is ON, while 222 is OFF |
| B | 221 is OFF, while 222 is ON |

The change-over switches 231 and 232 of the position detection signal change-over means 23 are selectable between the following two modes on the basis of the output signals sent from the control circuit 24:

| Operation mode of position detection change-over means 23 | Condition |
|---|---|
| C | 231 is ON, while 233 is OFF |
| D | 231 is OFF, while 232 is ON |

The operation of this system will hereinafter be described.

If the first main spindle is driven alone, the drive change-over means 21 is set in mode 1, the speed detection signal change-over means 22 is set in mode A, and the position detection signal change-over means 23 is set in mode C. In consequence, a speed detection signal transmitted from speed detecting means 3 linked to the first driving motor 2 is fed back to the drive control unit 10, thus forming a speed control loop. An output of the control unit 10 is then supplied via the change-over switch 211 to the main spindle driving motor 2. The main spindle driving motor 2 is speed-controlled in conformity with a speed command $N_s$, thereby controlling the rotation of the first main spindle.

A position detecting signal from the position detecting means 11 is fed back via the switch 231 to the feed control unit 10, permitting a positional control loop to be formed if necessary. Speed commands $N_s$ and position commands $\theta_s$ are produced by the numerical control unit in accordance with the mode of operation of the lathe. Therefore, whether the position control loop operates depends on the current mode of control, i.e., whether position control is selected. In FIG. 1, the connection between the signal line 31 and the unit 101 is illustrated in dotted lines to indicate that the position control loop is not always operative.

If the second main spindle is driven alone, the drive change-over means 21 is set in mode 2, the speed detection signal change-over means 22 is set in mode B, and the position detection signal change-over means 23 is set in mode D. With this arrangement, the second main spindle 2a is drive-controlled in a manner which mirrors the above described arrangement.

When drive change-over means 21 is set in mode 3, the speed detection signal change-over means 22 may be set in either mode A or B. As a result, a speed detection signal coming from the speed detection means 3 or 3a of the first of second main spindle driving motor is fed back, thus forming a speed control loop. The outputs of the drive control unit 10 are supplied via the change-over switches 211 and 212 concurrently to the first and second spindle motors 2 and 2a, with the result that the motors are speed-controlled at an exact and equal speed as prescribed by the speed command $N_s$.

When the positional control loop is formed as circumstances require, the position detection signal change-over means 23 is set in mode C when the speed detection signal change-over means 22 is in mode A, but is set in mode D when the means 22 is in mode B.

It is to be noted that when an induction motor is utilized as the main spindle driving motor, vector control based on a slip frequency control technique is adopted in order to increase speed and torque controllability and responsiveness. As is well known, control is performed to regulate the primary current imparted to the desired induction motor in such a manner that the primary current is separated into a torque shunt current iqs and an excitation shunt current (magnetic flux shunt current) ids. Let $R_2$ be the secondary resistance of the motor, let $L_2$ be the secondary inductance, let M be the mutual inductance, let ws be the slip frequency, let $\phi_2$ be the secondary magnetic flux, and let S be a differential operator. It is therefore required that control be performed so as to establish the following conditions:

$$ws = (R_2/L_2) \cdot M \cdot (iqs/\phi_2)$$

$$\phi_2 = M \times iqs / \{(L_2/R_2) \times S + 1\}$$

Namely, it is necessary that the speed control circuit 102 depicted in FIG. 1 be controlled to keep the foregoing conditions on the basis of the electrical constants $R_2$, M and $L_2$ of the induction motor to be driven. In FIG. 1, the speed control circuit 102 is adapted to be controlled by internally switching between using electrical constants of the first and second main spindle driving motors, in accordance with the output signals transmitted from the change-over control circuit 24. When both of the spindle motors 2 and 2a are simultaneously driven, synthetic constants for the two motors are employed. For instance, if the two motors are constructed according to the same specification, $$R_2 \rightarrow R_2/2 \quad L_2 \rightarrow L_2/2 \quad M \rightarrow M/2$$

For the purpose of securing the same magnetic flux as in the single motor driving process, the secondary magnetic flux $\phi_2 \rightarrow 2\phi_2$. Vector control is effected with high accuracy under the above-described conditions, and highly accurate speed control can be attained.

In accordance with the present invention, vector control is not a necessary criterion however, and other control methods can be used.

Figure 3A:
FIG. 3(a) and 3(b) show a diagram explaining an exemplary machining operation.
Figure 3B:

An explanation will be given with respect to a case where a product depicted in FIG. 3(b) is manufactured from the elongate workpiece depicted in FIG. 3(a).

At first, as illustrated in FIG. 1, the workpiece 8 is held by the chuck 7 provided on the first main spindle 1. The drive change-over means 21 is set in mode 1, the speed detection signal change-over means 22 is set in mode A, and the position detection signal change-over means 23 is set in mode C. The first main spindle is solely driven, while the tool 9 is moved in directions X and Z. The workpiece 8 is thus subjected to lathe turning. With the intention of ameliorating the speed fluctuation during machining, particularly at low speeds, if necessary, a positional control loop may be formed for machining. Furthermore, with the positional control loop in operation an oriented stop of the workpiece 8 at a prescribed angle can be attained.

After machining has been completed using the first main spindle 1, the main spindle 1 is temporarily halted, and, as circumstances require, an oriented stop of the workpiece may be made. The second main spindle 1a is shifted in the direction (−Z), and the chuck 7a is made to grasp the end of the machined workpiece 8. Subsequently, the chuck 7 of the first main spindle 1 is slackened, and the second main spindle 1a is moved in direction (+Z), thereby pulling the workpiece 8 from the main spindle 1 up to a predetermined position. The chuck 7 on the main spindle 1 is again fastened. The workpiece 8 is thus held by the chucks 7 and 7a. At the same time, the feed change-over means 21 is set in mode 3, the speed detection signal change-over means 22 is set in mode A, and the position detection signal change-over means 23 is set in mode C. The motors 2 and 2a are concurrently driven, and the workpiece 8 undergoes further machining by means of the tool 9. The tool 9 is moved in the X-direction during this machining, typically at the end of machining, to effect so-called protrusion machining (to sever the workpiece from the elongate stock). As a result, the workpiece 8 retained by the second main spindle 1a is formed into a completely machined product (FIG. 3(b)). The product is removed from the chuck 7a with both spindles stopped. The same machining process may be repeated, starting with changing to the first main spindle sole driving mode. Alternatively, after the severing step, machining may begin on the work 8 still held by the main spindle 1, with the two spindles not being stopped but continuing in the simultaneous drive mode. In this case, the product machined in the previous step is continuously rotated at a speed equal to that of the main spindle 1 while being held by the spindle 1a. If the machined product is removed from the spindle 1a when the two main spindles are stopped after machining of the next workpiece on the main spindle 1 is completed, the number of times the main spindles have to be stopped is reduced by one so that the machining cycle time can be further shortened.

According to the invention, the two main spindles 1 and 1a are simultaneously drive-controlled to thereby permit protrusion machining which includes final severing.

If no driving force acts on the second main spindle 1a when both chucks grasp the workpiece, the second main spindle 1a will merely function to hold one end of the workpiece 8. In such case, the second spindle may be driven by the first spindle through the workpiece 8. However, this mode of operation is usually not desirable. If severance machining is carried out in this state, for example, the workpiece will be twisted off just before final severance, creating a protrusion on the workpiece. Therefore, a subsequent step of modifying this protrusion would be needed. In accordance with the present invention, with simultaneous driving, the two main spindles 1 and 1a are burdened with substantially equal loads, and hence the workpiece is not twisted off even at final severance.

Figure 5A:
FIG. 5(a) and 5(b) show a diagram explaining another exemplary machining operation.
Figure 5B:
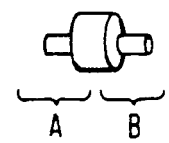
Figure 4A:
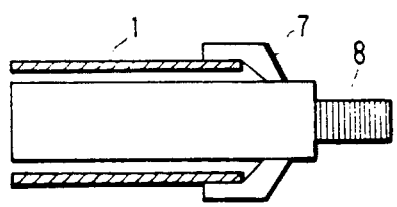
FIG. 4(a) and 4(b) show a diagram explaining the states of the machining operation shown in FIG. 3(a) and FIG. 3(b)
Figure 4B:
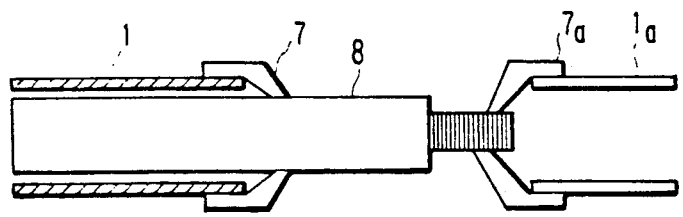
Figure 4C:
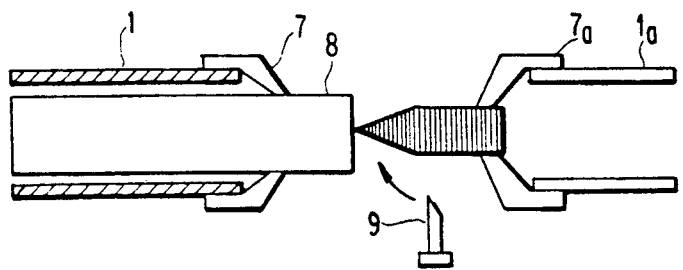

The operation of the invention has been described with reference to the case where products as depicted in FIG. 3(b) are consecutively manufactured from the elongate workpiece stock of FIG. 3(a). When manufacturing products from a short workpiece as illustrated in, e.g., FIG. 5, however, the first main spindle 1 is at first brought into the sole driving mode, and the workpiece is retained by the chuck 7. Part A of the product shown in FIG. 5(b) is machined, and thereafter the main spindle is temporarily stopped to shift the workpiece from the first main spindle 1 to the second main spindle 1a. The second main spindle 1a is then solely driven, and part B of the workpiece of FIG. 5(b) is subjected to machining, thus finishing the process.

As discussed above, the present invention allows one or both of the two main spindle driving motors to be drive-controlled using a single drive control unit by forming a speed loop or a positional control loop. With this constitution, an inexpensive and highly productive control unit can be obtained.

What is claimed is:

1. A spindle driving system for a machine tool having plural operational modes, the system comprising:
   first and second rotatable spindles;
   first and second drive motors for respectively rotating said first and second spindles;

a single drive controller for controlling the operation of said motors in accordance with an operational mode, wherein in a first operational mode said single drive controller controls operation of said first drive motor so as to cause said first rotatable spindle to rotate, in a second operational mode said single drive controller controls operation of said second drive motor so as to cause said second rotatable spindle to rotate, and in a third operational mode said single drive controller simultaneously controls operation of both said first and second drive motors so as to cause both first and second spindles to simultaneously rotate;

a switchover unit for selectively connecting said drive controller to said motors in accordance with an operational mode;

speed detectors associated with each of said motors; and speed detector output change-over unit for selectively coupling the output of at least one of said speed detectors to an input of said drive controller, to establish a speed control loop in accordance with an operational mode.

2. A system as claimed in claim 1, further comprising position detectors associated with each of said spindles, and a position detector output change-over unit for selectively coupling the output of one of said position detectors to said drive controller, to establish a position control loop.

3. A system as claimed in claim 2, wherein said speed detector output change-over unit and said position detector output change-over unit each comprise switch means, and further including switch over command means for controlling the operation of said switch over unit and said switch means.

4. A system as claimed in claim 1, further including chucks located at ends of said first and second spindles, both of said spindles being simultaneously rotationally controlled when said switch over unit connects said drive controller to both of said drive motors.

5. A spindle driving system for a machine tool having plural operational modes, the system comprising:

first and second rotatable spindles;

first and second drive motors for respectively rotating said first and second spindles;

a single drive controller for controlling the operation of said motors in accordance with an operational mode, wherein in a first operational mode said single drive controller controls operation of said first drive motor so as to cause said first rotatable spindle to rotate, in a second operational mode said single drive controller controls operation of said second drive motor so as to cause said second rotatable spindle to rotate, and in a third operational mode said single drive controller simultaneously controls operation of both said first and second drive motors so as to cause both first and second spindles to simultaneously rotate;

a switch over unit for selectively connecting said drive controller to said motors in accordance with an operational mode; and position detectors associated with each of said motors, and a position detector output change-over unit for selectively coupling the output of one of position detectors to said drive controller, to establish a speed control loop in accordance with an operational mode.

6. A system as claimed in claim 5, further comprising speed detectors associated with each of said motors; and a speed detector output change-over unit for selectively coupling the output of one of said speed detectors to an input of said drive controller, to establish a speed control loop, said position control loop being employed in dependence upon the mode of operation of said system.

7. A system as claimed in claim 6, further comprising chucks located at ends of said first and second spindles, both of said spindles being simultaneously rotationally controlled when said switch over unit connects said drive controller to both of said drive motors.

8. A spindle driving system for a machine tool having plural operational modes, the system comprising:

first and second rotatable spindles;

first and second drive motors for respectively rotating said first and second spindles;

a single drive controller for controlling the operation of said motors in accordance with an operational mode, wherein in a first operational mode said single drive controller controls operation of said first drive motor so as to cause said first rotatable spindle to rotate, in a second operational mode said single drive controller controls operation of said second drive motor so as to cause said second rotatable spindle to rotate, and in a third operational mode said single drive controller simultaneously controls operation of both said first and second drive motors so as to cause both first and second spindles to simultaneously rotate;

a switchover unit for selectively connecting said drive controller to said motors in accordance with an operational mode;

speed and position detectors associated with each of said motors;

a speed detector output change-over unit for selectively coupling the output of one of said speed detectors to an input of said drive controller, to establish a speed control loop in accordance with an operational mode; and a position detector output change-over unit for selectively coupling the output of one of said position detectors to said drive controller, to establish a position control loop in accordance with an operational mode.

* * * * *